(No Model.)
J. J. & T. A. RUDDY.
APPARATUS FOR SMOOTHING RIBBONS, &c.
No. 457,881. Patented Aug. 18, 1891.
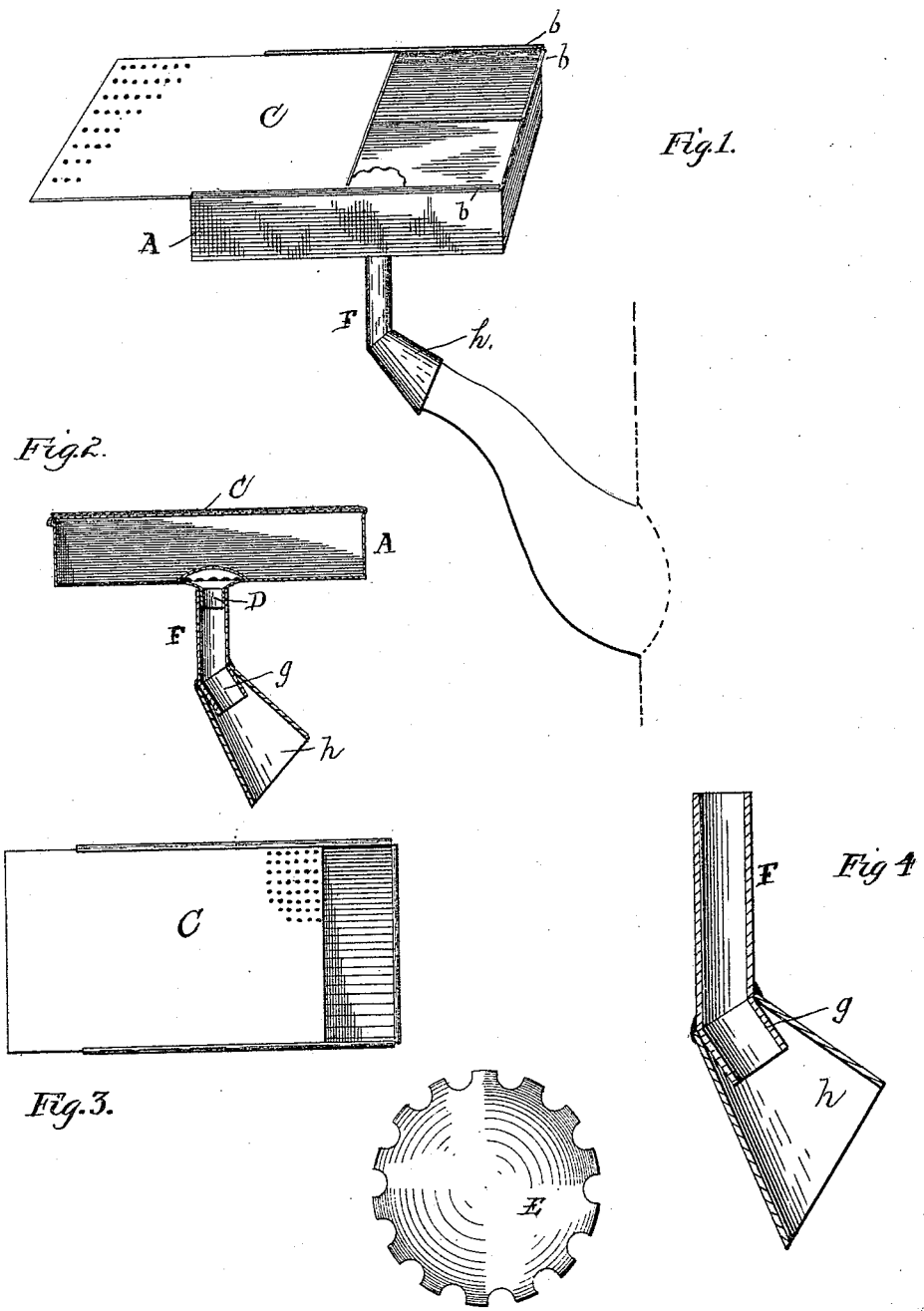

UNITED STATES PATENT OFFICE.

JAMES J. RUDDY AND THOMAS A. RUDDY, OF AURORA, ILLINOIS.

APPARATUS FOR SMOOTHING RIBBONS, &c.

SPECIFICATION forming part of Letters Patent No. 457,881, dated August 18, 1891.

Application filed January 30, 1891. Serial No. 379,722. (No model.)

*To all whom it may concern:*

Be it known that we, JAMES J. RUDDY and THOMAS A. RUDDY, both of Aurora, in the county of Kane and State of Illinois, have invented certain new and useful Improvements in Apparatus for Smoothing Ribbons, Plush, Silk, Laces, &c.; and we do hereby declare that the following is a full, clear, and exact description of the invention, which will enable others skilled in the art to which it appertains to make and use the same, reference being had to the accompanying drawings, and to letters of reference marked thereon, which form a part of this specification.

The object of our invention is to provide a simple, cheap, and efficient device or apparatus suitable for household use and adapted for smoothing—as if by ironing—such articles as ribbons, plush, velvet, silk, laces, &c., without in any manner destroying or impairing the gloss, as when using sad-irons, and without any possibility of scorching or burning the fabric.

The invention consists of a steam-box adapted to rest on and to be held by the spout of any ordinary tea-kettle or similar vessel and receive its steam from the spout and to distribute it within the box, and to discharge it through a perforated cover, over and on which cover the material to be smoothed is to be moved by hand, all as will now be more particularly described.

In the accompanying drawings, Figure 1 is a perspective view of a simple form of apparatus, serving to illustrate our invention as applied to the spout of a kettle, and with its perforated cover partially withdrawn (a few only of the perforations being shown;) Fig. 2, a central longitudinal section of the same; Fig. 3, a top view, the perforated cover being shown in place for use; Fig. 4, a central section (enlarged) of an attached or attachable tube, and Fig. 5, a plan (enlarged) of the deflector.

A is the metallic box or chamber, which may be of any desired size or shape, an oblong shape being preferred. It may be made of tin and of a single piece, the upper edges of its sides and back being bent into the form of grooves $b$ to receive a removable sliding perforated cover C, as shown. This cover may be made by simply cutting it of the required size out of a sheet of perforated tin or other sheet metal.

D is a steam-tube connected about centrally to the bottom of the box, and E a convex deflector-cap secured inside the box to its bottom, and it is of much larger diameter than said tube and it has numerous notches or scallops at its edge to allow the steam in entering the box from the tube, and after being first deflected downward by the arch of the cap, to be next diverted radially along the bottom of the box, so as to compel it to spread or diffuse itself in every direction from the center, to equalize as far as practicable its action upon the surfaces of the fabrics to be treated. Before the device is used, however, the perforated cover C is slid entirely to its place, so as to cover the whole steam-chamber, and the very small perforations in the cover, numbering many hundreds, effect a very general and equal distribution of the steam as it rises through such cover.

In order to apply this device readily to the nozzle or spout of a kettle we provide a tube F, having an angle or bend $g$ at its lower end, suitable to fit on or in such spout, and we prefer, also, to surround this part $g$ with a flaring shield $h$, which also assists in preventing escape of steam as it leaves the kettle to enter the box. This flaring mouth or shield $h$, which may have any shape or size desired, also permits the application of the device to spouts of different forms or sizes, whether the part $g$ makes a connection with the spout or not.

It will be evident that the steam-box may, by means of its steam-inlet tube, be connected to any steam-supplying tube or cock, but for domestic purposes the tea-kettle is almost always ready for immediate use.

The tube F may be fixed to the tube D or be removable therefrom, as preferred.

The operation is as follows: The box with its cover on is applied by its bent tube to the spout of the kettle containing hot water, (say as it sits upon the stove,) and thus gets its supply of wasting steam without cost either of time, money, or labor. The ribbon or fabric to be treated is then held firmly in both hands over and on the perforated plate with the hands a little below the plate, so as to exert a gentle pressure. It will be found that but a few movements of the fabric back and forth are required to smooth out perfectly any goods for which the apparatus is adapted, the steam supplying all the moisture necessary.

For pile fabrics—such as velvets, plushes, and the like—which have become matted down or wrinkled, it is well known that steam is very efficient in raising and restoring an even face to the pile, and we find the apparatus above described an admirable means for accomplishing this, and ribbon, silk, and other goods treated by it appear the same as when new and as though they had never been crumpled.

We claim—

1. A fabric-smoothing box provided on its under side with a supporting steam-inlet tube fitted to be applied to and supported on a tea-kettle spout, said box being also provided with an interior steam-distributer, and having a perforated cover, all substantially as set forth.

2. The described apparatus for steaming and smoothing ribbons, plush, velvet, silks, and other fabrics, consisting of a steam chest or box having a steam-receiving tube at its under side and whereby the chest may be supported on and receive steam from the spout of a tea-kettle or similar vessel, a concave deflector over the outlet-mouth of such tube provided with a series of openings at its base and serving to deflect the steam downward over the area of the chest, and a perforated cover for the chest, all as set forth.

JAMES J. RUDDY.
THOMAS A. RUDDY.

Witnesses:
JOHN P. CALLAN,
THOMAS A. LAKE.